(12) United States Patent
Erwin et al.

(10) Patent No.: US 10,171,684 B1
(45) Date of Patent: Jan. 1, 2019

(54) SYSTEM AND METHOD FOR DETECTING ELECTROSTATIC DISCHARGE EVENTS IN AN IMAGING DEVICE HAVING A SCANNER

(71) Applicant: Lexmark International, Inc., Lexington, KY (US)

(72) Inventors: Phillip Daniel Erwin, Lexington, KY (US); John Thomas Fessler, Lexington, KY (US); Keith Bryan Hardin, Lexington, KY (US); Michael Todd Phillips, Frankfort, KY (US); Kark Mark Thompson, Midway, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 15/719,873

(22) Filed: Sep. 29, 2017

Related U.S. Application Data

(60) Provisional application No. 62/552,938, filed on Aug. 31, 2017.

(51) Int. Cl.
  *G06K 15/00* (2006.01)
  *H04N 1/00* (2006.01)
  *H04N 1/401* (2006.01)
  *H04N 1/40* (2006.01)

(52) U.S. Cl.
  CPC ..... *H04N 1/00037* (2013.01); *H04N 1/00018* (2013.01); *H04N 1/00063* (2013.01); *H04N 1/00076* (2013.01); *H04N 1/00832* (2013.01); *H04N 1/00994* (2013.01); *H04N 1/401* (2013.01); *H04N 1/0032* (2013.01); *H04N 2201/0081* (2013.01)

(58) Field of Classification Search
  None
  See application file for complete search history.

(56) References Cited

U.S. PATENT DOCUMENTS

| | | | |
|---|---|---|---|
| 2008/0285096 A1* | 11/2008 | Cui | H04N 1/00005 358/496 |
| 2012/0008180 A1* | 1/2012 | Ishido | H04N 1/401 358/509 |
| 2017/0331983 A1* | 11/2017 | Ishido | H04N 1/58 |
| 2018/0013914 A1* | 1/2018 | Suzuki | H04N 1/00037 |

FOREIGN PATENT DOCUMENTS

JP    11069047 A   *  3/1999

* cited by examiner

*Primary Examiner* — Dov Popovici

(57) ABSTRACT

A method for detecting electrostatic discharge (ESD) events in an imaging device includes scanning a target placed in a scanner to create a scanned image of the target. The scanned image has a plurality of scan lines with each scan line having a number of pixels or samples. For each of the plurality of scan lines, a determination is whether or not the number of pixels or samples of the scan line matches a respective predetermined number of pixels or samples, the predetermined number of pixels or samples being based upon a resolution setting of the scanner. Upon determining that the number of pixels or samples of the scan line does not match the predetermined number of pixels or samples, a count value is incremented. The count value is used as a health-check data to indicate at least one ESD event has occurred in the imaging device.

20 Claims, 4 Drawing Sheets

SYSTEM AND METHOD FOR DETECTING ELECTROSTATIC DISCHARGE EVENTS IN AN IMAGING DEVICE HAVING A SCANNER

CROSS REFERENCES TO RELATED APPLICATIONS

The present application is related to and claims priority under 35 U.S.C. 119(e) from U.S. provisional application No. 62/552,938, filed Aug. 31, 2017, entitled, "SYSTEM AND METHOD FOR DETECTING ELECTROSTATIC DISCHARGE EVENTS IN AN IMAGING DEVICE USING A SCANNER THEREOF" the content of which is hereby incorporated by reference herein in its entirety and which is assigned to the assignee of the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present disclosure relates generally to imaging devices, and, more particularly, to systems and methods for detecting electrostatic discharge events in an imaging device using a scanner thereof.

2. Description of the Related Art

Varieties of electronic systems are sensitive to electrostatic discharge (ESD) and are typically subjected either by self-induced ESD events or external ESD events. If the magnitude or occurrence rate of ESD events is high, such ESD events may cause false logic events or even damage the electronic system. In order to allow an electronic system to work as designed, it is important to control the magnitude and occurrence rate of ESD events.

In imaging devices such as electrophotographic and inkjet printers, ESD events typically occur due to media moving across plastic parts, rubber rollers, etc., along a media path. These self-induced ESD events can cause false firmware issues, crashes, corrupted copies/scans, corrupted prints, etc. Thus, it is important to eliminate or at least reduce occurrence of ESD events in order to reduce, if not eliminate, system failures. Existing techniques for dealing with ESD includes adding ESD protection circuits to the systems early in the design phase based on past experience and system knowledge. Other attempts to increase ESD robustness include adding dedicated hardware for actively monitoring ESD and preventing the same from affecting the system by using ESD protection devices. However, the use of additional dedicated hardware and sensors to detect ESD events typically presents added cost and complexity. Accordingly, there is a need for an improved system for detecting ESD.

SUMMARY OF THE INVENTION

Disclosed is a method for detecting electrostatic discharge (ESD) events in an imaging device. The method includes activating a scanner of the imaging device to perform a scan line operation to capture a scan line, the captured scan line having a number of pixels or samples. A determination is made whether or not a mismatch exists between the number of pixels or samples of the scan line and a predetermined number of pixels or samples. Upon determining that a mismatch exists between the number of pixels or samples of the scan line and the predetermined number of pixels or samples, a count value is incremented which indicates at least one ESD event occurring in the imaging device.

In another example embodiment, a method for detecting ESD events in an imaging device includes scanning a target placed in a scanner to create a scanned image of the target. The scanned image has a plurality of scan lines with each scan line having a number of pixels or samples. For each of the plurality of scan lines, a determination is whether or not the number of pixels or samples of the scan line matches a predetermined number of pixels or samples, the predetermined number of pixels or samples being based upon a resolution setting of the scanner. Upon determining that the scan line has a number of pixels or samples that does not match the predetermined number of pixels or samples, a count value is incremented. The count value is used as healthcheck data to indicate whether ESD events are occurring within the imaging device. In one example embodiment, a determination is made whether or not the count value exceeds a predetermined threshold. Upon determining that the count value exceeds the predetermined threshold, an indication is made that the ESD event is occurring within the imaging device.

In another example embodiment, a method for detecting ESD events in an imaging device includes scanning a target placed in a scanner of the imaging device to create a scanned image of the target, the scanned image having a plurality of scan lines. Each scan line of the plurality of scan lines is transmitted to a shading block for shading correction. For each scan line of the plurality of scan lines, a determination is made whether or not an error has occurred during the shading correction of the scan line. Upon determining that the error has occurred during the shading correction of the scan line, a count value is incremented which indicates an ESD event occurring in the imaging device. In one example embodiment, determining the error during the shading correction of the scan line includes determining whether or not a number of pixels or samples of the scan line matches a predetermined number of pixels or samples.

BRIEF DESCRIPTION OF THE DRAWINGS

The above-mentioned and other features and advantages of this present disclosure, and the manner of attaining them, will become more apparent and the present disclosure will be better understood by reference to the following description of embodiments of the present disclosure taken in conjunction with the accompanying drawings.

DETAILED DESCRIPTION

Figure 1:
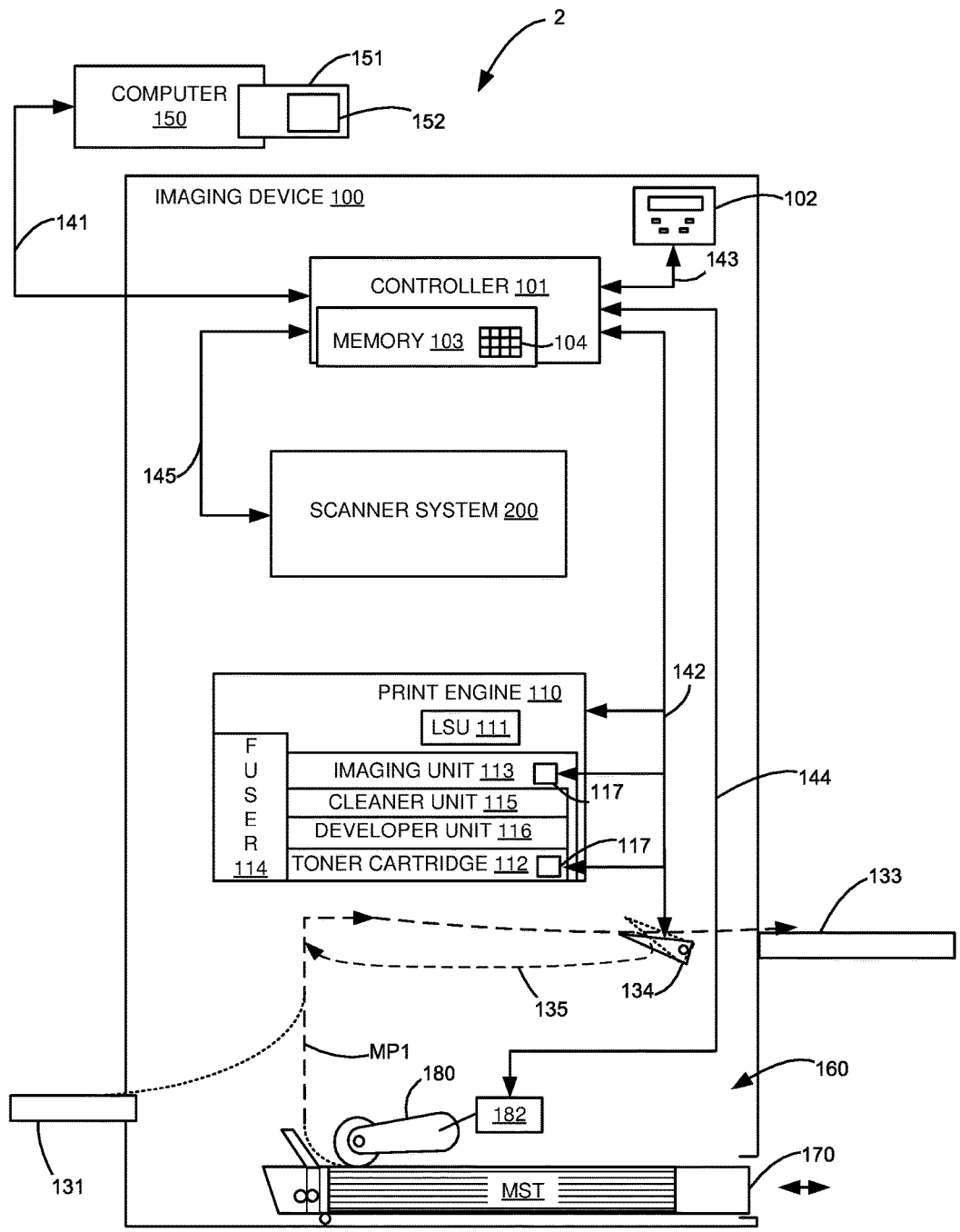
FIG. 1 is a schematic illustration of an imaging system according to an example embodiment.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise. The use of "including," "comprising," or "having" and variations thereof herein is meant to encompass the items listed thereafter and equivalents thereof as well as additional items. Terms such as "about" and the like are used to describe various characteristics of an object, and such terms have their ordinary and customary meaning to persons of ordinary skill in the pertinent art.

Terms such as "about" and the like have a contextual meaning, are used to describe various characteristics of an object, and such terms have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as "first", "second", and the like, are also used to describe various elements, regions, sections, etc. and are also not intended to be limiting. Like terms refer to like elements throughout the description.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

The term "image" as used herein encompasses any printed or electronic form of text, graphics, or a combination thereof. "Media" or "media sheet" refers to a material that receives a printed image or, with a document to be scanned, a material containing a printed image. The media is said to move along a media path, a media branch, and a media path extension from an upstream location to a downstream location as it moves from the media trays to the output area of the imaging system. The term "target" refers to the media sheet having an image to be scanned.

Referring now to the drawings and particularly to FIG. 1, there is shown a diagrammatic depiction of an imaging system 2. As shown, imaging system 2 includes an imaging device 100, and an optional computer 150 connected to imaging device 100. Imaging device 100 is shown as a printer that includes a controller 101, a print engine 110, a user interface 102, and a scanner system 200. Imaging device 100 may also be configured to include various finishing options such as a stapler and hole punch, neither are shown.

Controller 101 includes a processor unit and associated memory 103, and may be formed as one or more Application Specific Integrated Circuits (ASICs). Memory 103 may be any volatile or non-volatile memory or combination thereof such as, for example, random access memory (RAM), read only memory (ROM), flash memory and/or non-volatile RAM (NVRAM). Alternatively, memory 103 may be in the form of a separate electronic memory (e.g., RAM, ROM, and/or NVRAM), a hard drive, a CD or DVD drive, or any memory device convenient for use with controller 101. Memory 103 may contain computer programs, imaging drivers, and/or look-up tables, generally indicated at 104, to be used in controlling operation of imaging device 100 or one or more of its subsystems.

In FIG. 1, controller 101 is illustrated as being communicatively coupled with computer 150 via communication link 141. Controller 101 is illustrated as being communicatively coupled with print engine 110, user interface 102, and scanner system 200 via communication links 142, 143, 145, respectively. Computer 150 includes in its memory 151 a software program including program instructions that function as an imaging driver 152, e.g., printer/scanner driver software, for imaging device 100. Imaging driver 152 is in communication with controller 101 of imaging device 100 via communication link 141. Imaging driver 152 facilitates communication between imaging device 100 and computer 150. One aspect of imaging driver 152 may be, for example, to provide formatted print data to imaging device 100, and more particularly to print engine 110, to print an image. Another aspect of imaging driver 152 may be, for example, to facilitate collection of scanned data from scanner system 200.

In some circumstances, it may be desirable to operate imaging device 100 in a standalone mode. In the standalone mode, imaging device 100 is capable of functioning without computer 150. Accordingly, all or a portion of imaging driver 152, or a similar driver, may be located in controller 101 of imaging device 100 so as to accommodate printing and/or scanning functionality when operating in the standalone mode.

Print engine 110 and user interface 102 may include firmware maintained in memory 103 which may be performed by controller 101 or another processing element. Controller 101 may be, for example, a combined printer and scanner controller. Controller 101 serves to process print data and to operate print engine 110 and its subassemblies such as a laser scan unit (LSU) 111, a toner cartridge 112, an imaging unit 113, a fuser 114, a cleaner unit 115 and a developer unit 116, during printing. Controller 101 also serves to operate scanner system 200 and process scanned data obtained via scanner system 200. Controller 101 may provide to computer 150 and/or to user interface 102 status indications and messages regarding the media supply, media transport, imaging device 100 itself or any of its subsystems, consumables status, etc. Computer 150 may provide operating commands to imaging device 100. Computer 150 may be located nearby imaging device 100 or be remotely connected to imaging device 100 via an internal or external computer network. Imaging device 100 may also be communicatively coupled to other imaging devices.

Print engine 110 is illustrated as including LSU 111, toner cartridge 112, imaging unit 113, and fuser 114, all mounted within imaging device 100. Imaging unit 113 may be removably mounted within imaging device 100 and includes developer unit 116 that houses a toner sump and a toner delivery system. The toner delivery system includes a toner adder roll that provides toner from the toner sump to a developer roll. A doctor blade provides a metered uniform layer of toner on the surface of the developer roll. Cleaner unit 115 houses a photoconductive drum and a waste toner removal system. Toner cartridge 112 is also removably mounted in imaging device 100 in a mating relationship with developer unit 116 of imaging unit 113. An exit port on toner cartridge 112 communicates with an entrance port on developer unit 116 allowing toner to be periodically transferred from toner cartridge 112 to resupply the toner sump in developer unit 116. Both imaging unit 113 and toner cartridge 112 may be replaceable items for imaging device 100. Imaging unit 113 and toner cartridge 112 may each have a memory device 117 mounted thereon for providing component authentication and information such as type of unit, capacity, toner type, toner loading, pages printed, etc. Memory device 117 is illustrated as being operatively coupled to controller 101 via communication link 142.

Imaging device 100 includes a media feed system 160 having a removable media input tray 170 for holding a media stack MST, and a pick mechanism 180 with a drive mechanism 182 positioned adjacent removable media input tray 170. Pick mechanism 180 is mechanically coupled to drive mechanism 182 that is controlled by controller 101 via communication link 144. A first media path MP1 (shown in dashed line) is provided from removable media input tray 170 extending through print engine 110 to a media output area 133 or to a duplexer 135. Media feed system 160 controls the feeding of media along a first media path MP1 from media stack MST in media input tray 170 through print engine 110 to media output area 133 using pick mechanism 180 and feed rolls along first media path MP1 as is known in the art. A multipurpose input tray 131 is also shown and is used to feed either a single media sheet or a small number of media sheets, envelopes, or other types of media into the media path MP1 and through print engine 110.

The electrophotographic imaging process is well known in the art and, therefore, will be only briefly described. During an imaging operation, LSU 111 creates a latent image by discharging portions of the charged surface of the photoconductive drum in cleaner unit 115. Toner is transferred from the toner sump in developer unit 116 to the latent image on the photoconductive drum by the developer roll to create a toned image. The toned image is then transferred either directly to a media sheet received in imaging unit 113 from media input tray 170 or to an intermediate transfer member (ITM) and then to a media sheet. Next, the toned image is fused to the media sheet in fuser 114 and then sent to media output area 133 or duplexer 135. One or more gates 134, illustrated as being in operable communication with controller 101 via communication link 142, are used to direct the media sheet to media output area 133 or duplexer 135. Toner remnants are removed from the photoconductive drum by the waste toner removal system housed within cleaner unit 115. As toner is depleted from developer unit 116, toner is transferred from toner cartridge 112 into developer unit 116. Controller 101 provides for the coordination of these activities including media movement occurring during the imaging process.

Figure 2:
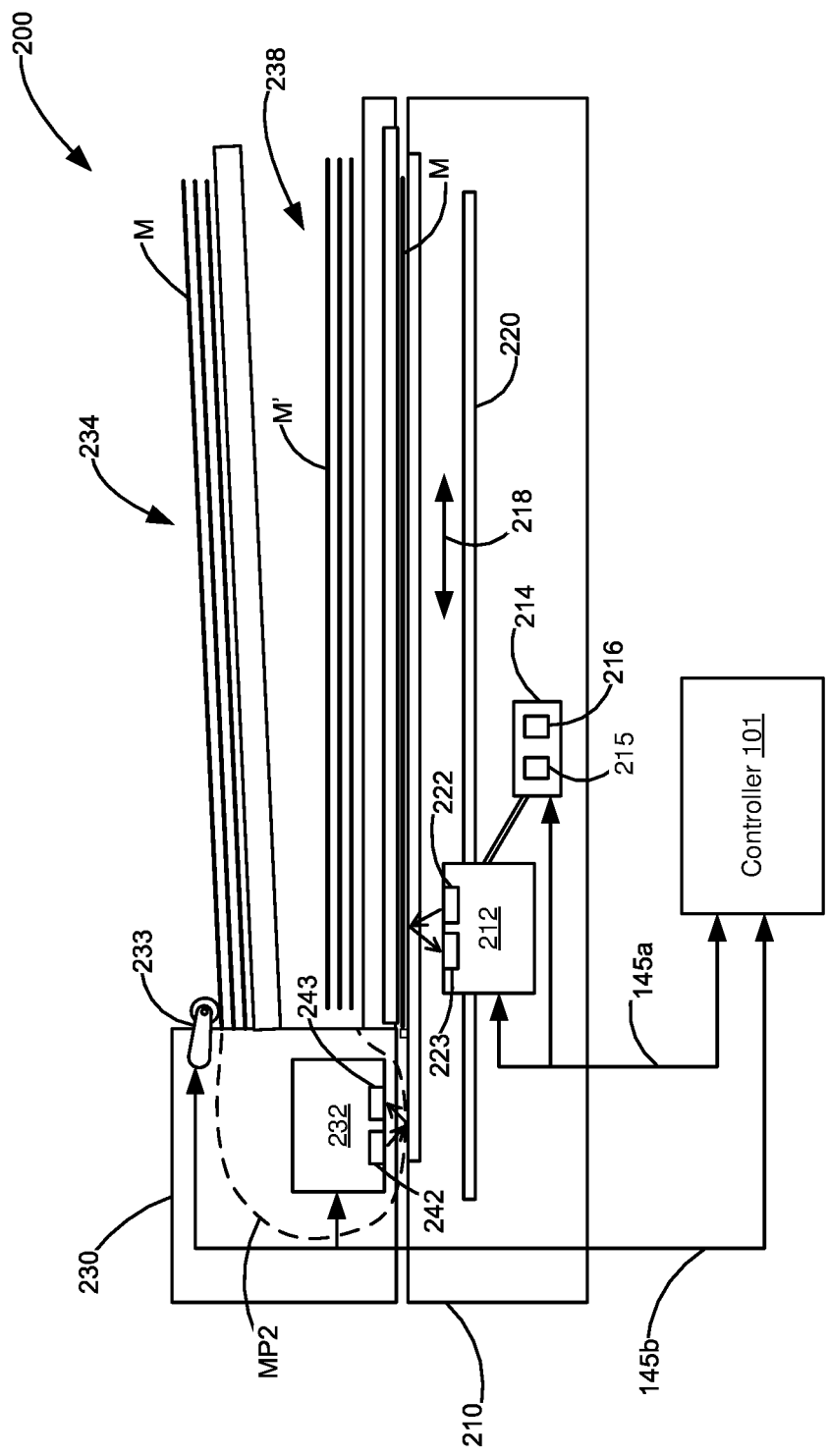
FIG. 2 is a schematic illustration of a scanner system of an imaging device of the imaging system in FIG. 1 according to an example embodiment.

Referring to FIG. 2, a schematic representation of scanner system 200 is illustrated. Scanner system 200 includes a flatbed scanner 210 and an automatic document feeder (ADF) 230. Flatbed scanner 210 includes a first image capture module or flatbed scan bar 212 operatively coupled to a drive mechanism 214. Drive mechanism 214 includes one or more gear and/or belt mechanisms 215 and a drive motor 216. Drive mechanism 214 is used to translate flatbed scanner 212 bi-directionally, as indicated by arrow 218, along a pair of spaced parallel rails 220. ADF 230 includes an input media area 234, a pick mechanism 233, a second media path MP2, a second image capture module or ADF scan bar 232, and an output media area 238. Original media sheets M to be scanned are placed in input media area 234. Pick mechanism 233 is used to feed each media sheet M placed on input media area 234 one at a time into media path MP2 for scanning within ADF 230. Scanned media sheets M' are collected in output media area 238.

Each of flatbed and ADF scan bars 212, 232 generally includes a respective light source 222, 242 for illuminating a surface of a media sheet to be scanned, and a respective photoreceptor array 223, 243 for receiving light reflected from the illuminated surface. Each light source 222, 242 may include an array of red, green and blue light emitting diodes (LEDs) or white LEDs, together with, in some cases, a reflector, a diffuser or light guide, that span the width of the respective scan areas of flatbed scanner 210 and ADF 230 of scanner system 200. Photoreceptor array 223, 243 may each include 300, 600, 1200, 2400 or 4800 photoreceptors (such as phototransistors or light-sensitive diodes) per inch (depending on resolution), and respectively span the width of the scan areas of flatbed scanner 210 and ADF 230. In one example, each of flatbed and ADF scan bars 212, 232 may comprise a charge-coupled device (CCD) module, a contact image sensor (CIS) scan bar, or an optical reduction scan bar. Flatbed and ADF scan bars 212, 232 do not have to be of the same type. Regardless of the type of scan bar used, the scanned data forming the digital image contains a fixed number of rows and columns comprised of pixels. Pixels are the smallest individual element in the digital image, holding quantized values that represent the brightness of a given color at any specific point. Typically, the pixels are stored in memory as a raster image or a raster map, a two-dimensional array of small integers. These values are often transmitted or stored in a compressed form. The digital images may start out in non-square arrays such as 1200×600 PPI (Pixels Per Inch) or 600×300 PPI or in square arrays such as 300×300 PPI.

Flatbed scanner 210 is in operable communication with controller 101 via communication link 145*a*. ADF 230 is in operable communication with controller 101 via communication link 145*b*. As used herein, the term "communication link" generally refers to a structure that facilitates electronic communication between two components, and may operate using wired or wireless technology. Accordingly, a communication link may be a direct electrical wired connection, a direct wireless connection (e.g., infrared or r.f.), or a network connection (wired or wireless), such as for example, an Ethernet local area network (LAN) or a wireless networking standard, such as IEEE 802.11. Although separate communication links are shown between controller 101 and the other controlled elements, a single communication link can be used to communicatively couple controller 101 to all of the controlled elements such as first and second scan bars 212, 232. For example, one or more FCC connectors may be used to connect components of scanner system 200 to controller 101.

Controller 101 executes program instructions stored in memory 103 to effect the scanning on media or target M to form a digital image thereof. For example, where duplex scanning is selected, flatbed scan bar 212 is positioned adjacent to but offset from ADF scan bar 232 and media M is fed through ADF 230 from media input area 234 to pass by first and second scan bars 212, 232 where the top and bottom surfaces, respectively, are scanned and then out to media output area 238. Similarly, if multiple sheets of media were to be one-sided or simplex scanned, the sheets of media may be placed in media input area 234 and fed through ADF 230 and past ADF scan bar 232 or flatbed scan bar 212, depending on the design of scanner system 200, and out to output media area 238. When a target M is placed on a platen of flatbed scanner 210, controller 101 would, using scan drive motor 216, cause flatbed scan bar 212 to translate along rails 220 to scan the bottom surface of the target M and provide successive scan lines containing image data of the target M that is viewed by flatbed scan bar 210. The image data is stored in memory 103 for further processing.

Figure 3:
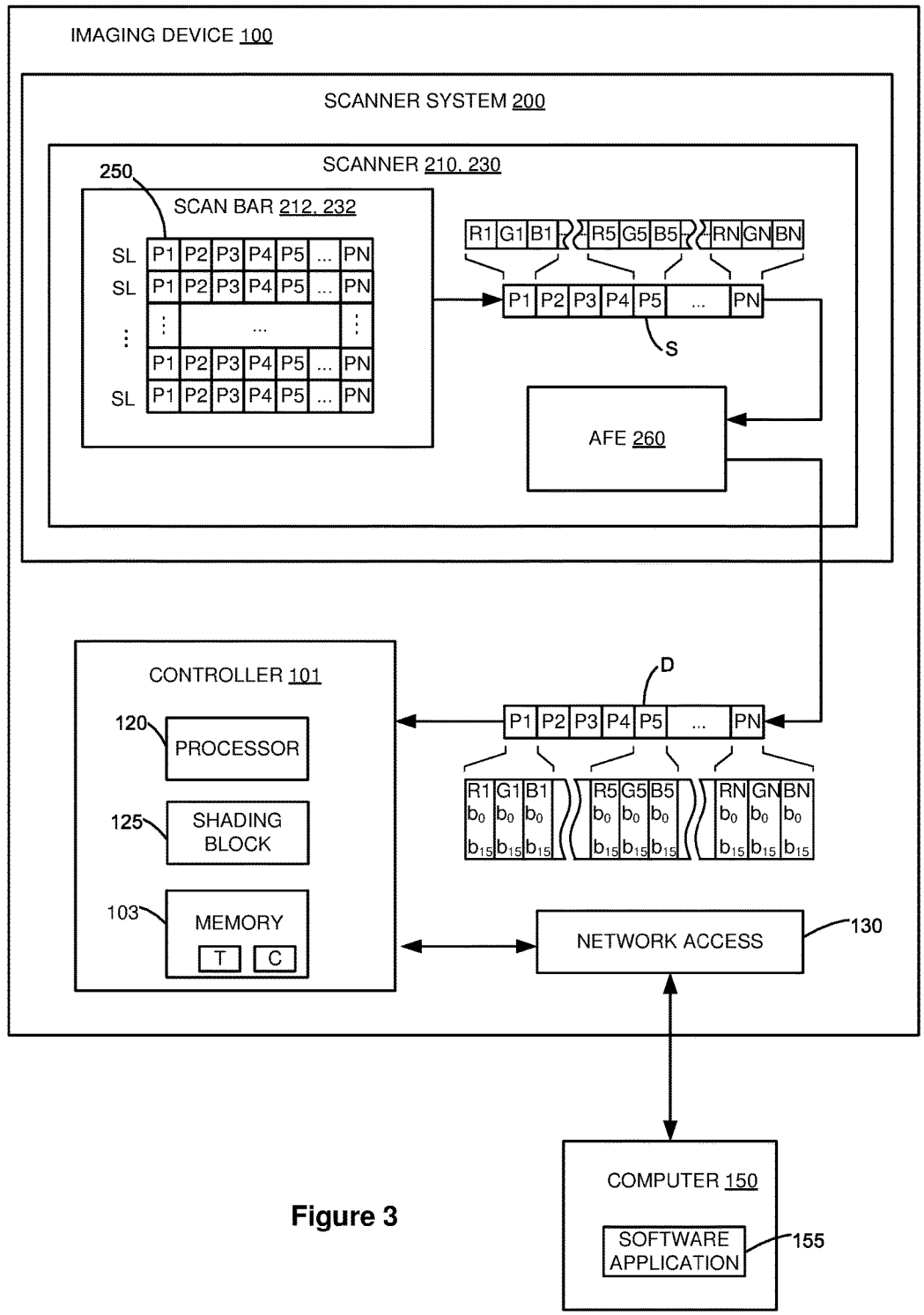
FIG. 3 illustrates a simplified functional block diagram of the imaging device including the scanner system according to an example embodiment.

FIG. 3 illustrates a simplified functional block diagram of imaging device 100 including scanner system 200 and controller 101. ADF 230 and flatbed scanner 210 generally operate independently from each other but are shown in FIG. 3 as being incorporated into one functional block within scanner system 200 for ease of description. That is, since each of ADF 230 and flatbed scanner 210 operates to capture scan line data from a target using their respective scan bars, only one functional block is used to represent both ADF 230 and flatbed scanner 210. Hereinafter, any one of ADF 230 and flatbed scanner 210 may be referred to as scanner 210, 230.

Scanner 210, 230 includes either flatbed scan bar 212 or ADF scan bar 232, generally indicated as scan bar 212, 232 in FIG. 3, and an analog front-end (AFE) circuitry 260. The photoreceptor array of scan bar 212, 232 generates analog signals representing scanned pixels from each line of the scanned target. AFE circuitry 260 may include peripherals that provide signal conditioning and analog-to-digital conversion functions for pixel data obtained by scan bar 212, 232. For example, AFE circuitry 260 may include A/D converters and multiplexers that are used to convert a plurality of analog inputs that are clocked out from scan bar 212, 232 to digital values that are provided to controller 101. Additional circuits on board may also be used to convert signals into forms suitable for use by controller 101. As an example, FIG. 3 shows a scanned image 250 obtained from scan bar 212, 232. Scanned image 250 includes a plurality of scan lines SL sequentially captured using scan bar 212, 232 with each scan line SL including pixels P1, P2, P3, P4, P5 through PN, where N is the total number of pixels per scan line SL. The number of scan lines SL generally depends on the size of the target being scanned and the resolution setting of the scan mode. For example, stepping at 300 PPI down a letter-sized page (8.5×11 inches) would yield 3300 scan lines per page, and stepping at 600 PPI down the same letter-sized target would yield 6600 scan lines per page. Each scan line SL would have a predetermined number of pixels depending on the resolution setting of the photoreceptor array of scan bar 212, 232.

For each scan line SL, an analog signal S, representing analog pixels P1, P2, P3, P4, P5 through PN of scan line SL, is clocked as an input signal to AFE circuitry 260. Typically, a colored pixel would have three components or samples, Red(R), Green(B), and Blue(B), to make up one colored pixel, while a mono pixel would have a single sample. In the example shown, pixels P1, P2, P3, P4, P5 through PN are illustrated as colored pixels with each pixel having three samples RnGnBn. As used hereinafter, the term "sample" may refer to a single pixel or a color component of a colored pixel. AFE circuitry 260 may apply an offset and/or gain to each pixel value (R1, G1, B1), (R2, G2, B2) through (RN, GN, BN), and then convert the analog signal S to a digital signal D. Depending on bit depth, the number of bits per pixel or the number of bits for each color component of a single pixel may vary. For example, a pixel or each color component of a pixel may be 1, 2, 4, 8, 16 or 32 bits each. In the example illustrated, each color component RGB of each pixel PN in digital signal D is 16 bits each. The digital signal D is then clocked into controller 101 and/or stored in memory 103 for further digital processing.

In an example embodiment, controller 101 includes a shading block 125 that is used to correct image distortion on scanned images. In general, shading block 125 receives as input scanned image data including scan lines SL provided to controller 101 from scanner system 200 and acts on individual pixels P1, P2, P3, P4, P5, through PN per scan line SL by taking each pixel and adjusting it to a target to achieve a generally flat signal output. There are several phenomena shading attempts to compensate for. These include: 1) in the same color channel, there will be a pixel to pixel variation in light sensitivity; 2) the edges of a scan are darker due to the vignetting effect of the lens; 3) any contamination in the optical path can partially block the light from reaching a pixel; and, 4) variation in light output across the scan line. Shading block 125 may utilize one or more shading tables stored in memory 103 for correcting image distortion on scanned images depending on the scanning mode.

Due to media sheets moving along media paths within imaging device 100, such as media paths MP1 and MP2, across various rollers and plastic parts, charge may accumulate on media sheets and/or on certain areas within imaging device 100 which can cause ESD events to build-up within imaging device 100. ESD events may cause false logic events, erroneous readings from the various sensors, false firmware issues, crashes, corrupted copies/scan and print, and may even damage imaging device 100. For example, ESD events may disturb the operation of scanner system 200 by disrupting the clocking and/or control of AFE circuitry 260 and cause it to add, miss, or loose pixel information in a scan line prior to or when sending digital signal D to controller 101. In another example, clock signal from controller 101 and the image data line from AFE circuitry 260 may have glitches due to occurrence of ESD events causing controller 101 to miss a clock edge resulting in a pixel or sample of a scan line SL to be missed, or controller 101 to see an extra clock edge resulting in an extra pixel or sample of a scan line SL to be added.

In an example embodiment, shading block 125 is programmed to expect a predetermined number of pixels (or samples per scan line SL for colored pixels) based on the resolution setting of scan bar 212, 232. In the example shown in FIG. 3, shading block 125 is programmed to expect N pixels (or 3*N samples) per scan line SL. During use, shading block 125 counts the number of pixels/samples per scan line SL received by controller 101 from AFE circuitry 260 and compares the pixel/sample count per scan line SL to the expected number of pixels/samples N. If a mismatch exists between the pixel/sample count and the expected number of pixels/samples per received scan line SL, shading block 125 is configured to initiate an interrupt indicating the mismatch. For example, if shading block 125 determines a pixel/sample count X for a received scan line SL and a trigger condition X≠N (or 3*N), where N is the expected number of pixels, is satisfied, shading block 125 initiates an interrupt indicating a mismatch. A mismatch between the pixel/sample count X and the expected number of pixels/samples N (or 3*N) for a particular scan line SL may indicate that one or more errors have occurred in applying shading correction to such scan line SL. As shading block 125 receives each scan line SL of scanned image 250, controller 101 keeps track of the number of interrupts from shading block 125 and stores the number of interrupts as a shade error count C in memory 103. In one example, controller 101 may increment shade error count C after every scan job based on the number of mismatches found during the scan job. In another example, the shade error count C may be incremented after every interrupt initiated by shading block 125 as shading block 125 processes each scan line during scanning operations, thus allowing real-time ESD detection. The shade error count C stored in memory 103 and which indicates a total number of scan lines received by controller 101 with mismatched pixel/sample count may then be transferred to a remote computing device for analysis by a program running on the computing device or by a user.

In an example embodiment, the recorded total number of scan lines with mismatched pixel/sample count, i.e., shade error count C, stored in memory 103 may be used to test or debug imaging device 100 for ESD events. For example, the shade error count C may be provided as healthcheck data for use in detecting ESD events. Other parameters or values may also be derived from the shade error count C and used as healthcheck data for detecting ESD events. As used herein, the terms "test" and "debug" are intended to include those operations typically performed during development, testing, debugging, system analysis and field monitoring and servicing of imaging device 100 and its subs-systems, and is not intended to be limited to only one phase or time period of system activity from design through the usable life of imaging device 100.

With further reference to FIG. 3, computer 150 is connected to imaging device 100 for controlling a test or debug session on imaging device 100, or for diagnosing imaging device 100. Imaging device 100 includes a network access device 130 which communicatively couples controller 101 to computer 150. Computer 150 may be any computing device such as a personal computer, a mobile device, a notebook computer, a netbook, a tablet computer, or any other remote computing device. Computer 150 includes a software application 155 that allows a user to query and retrieve healthcheck data, including shade error count C, from imaging device 100. In one example, software application 155 may be a healthcheck and/or diagnostic tool. Software application 155 may display, via a user interface of computer 150, the shade error count C. The user may then use the shade error count C to evaluate whether or not ESD events are occurring in imaging device 100. For example, if the shade error count C reaches a predetermined threshold value, it may be determined that ESD events are occurring within imaging device 100. The threshold value can have a value of at least 1 depending on a desired tolerance level. For example, a very low threshold, such as a threshold value of 1, may be used if the tolerance level requires tight control of ESD occurrence in that even a single mismatch must be flagged and reported to a user to account for any possibility that ESD events are occurring within imaging device 100. In another example, the threshold value may be selected based on the level at which the number of shade errors causes undesirable effects on the final image. As an example and not a limitation, consider a minor shade error count C of about ten indicating ten scan lines have mismatched pixel/sample counts recorded within a certain period (e.g., one week). If such shade error count is significant enough to cause corrupted scan lines to appear and be visible on a customer's image, then the threshold value may be selected based on the measurement of 10 shade error counts per week. Still as an example and not a limitation, if a shade error count of 1 for every 100 scanned pages causes visible image corruption, then the threshold value may be selected based on the measurement of 1 shade error count per 100 scanned pages. The user may perform at least one corrective action if it is determined that ESD events are occurring within imaging device 100. For example, the user may provide additional grounding within imaging device 100 at specific locations to reduce and/or eliminate occurrence of ESD events. The user may use one or more predetermined metrics and/or empirically determined data to determine the locations at which ESD events are likely occurring in imaging device 100. For example, a list of possible ESD-prone areas within imaging device 100 may be empirically determined and verified, and at least one of the possible ESD-prone areas may be tested by the user for ESD issues if a determination is made that ESD events are likely occurring within imaging device 100 based on the shade error count C. In addition or in the alternative, software application 155 may have access to a stored lookup table containing a list of possible ESD-prone areas in imaging device 100, select at least one ESD-prone area from the list based on the shade error count, and provide the selected at least one ESD-prone area as feedback to the user. Accordingly, imaging device 100 can be diagnosed for ESD events by taking advantage of and utilizing the sensitivity of scanner system 200 to ESD events in order to ensure proper functioning of imaging device 100. Utilizing the sensitivity of scanner system 200 for ESD detection avoids having to implement additional dedicated hardware and sensors for sensing ESD events within imaging device 100.

In another example embodiment, imaging device 100 may be configured to determine whether or not ESD events are occurring within imaging device 100 based on the shade error count C. For example, code may be written in firmware of imaging device 100 to perform ESD detection using scanner system 200 and shade error count C, as discussed above, and provide feedback to a user regarding device status, conditions, errors and/or warning messages or instructions if the shade error count C reaches a threshold value. For example, imaging device 100 may provide an indication or notification to a user via user interface 102 that the shade error count C has reached a threshold value, and/or a corresponding error/warning message indicating a potential ESD issue occurring within imaging device 100 and that a service call may be needed to fix the issue. Imaging device 100 may also print out a healthcheck report upon user request. The healthcheck report may include the shade error count C and/or a warning message indicating a potential ESD issue or an issue with the grounding system of the imaging device, and/or instructions to fix the issue or to contact technical support to fix the issue.

In another example, the shade error count C may direct controller 101 to access a stored lookup table T stored in memory 103 (or remotely over the Internet, in the cloud on a server, a USB drive, an external hard drive, or other storage location external to imaging device 100) to look for an association or mapping indicating areas within imaging device 100 where ESD events are potentially occurring. For example, lookup table T may include shade error counts that correlate to different ESD-prone areas within imaging device 100. An example lookup table showing shade error counts and corresponding ESD-prone areas is illustrated in Table 1.

TABLE 1

| Shade Error Count C | ESD Prone Area in Imaging Device |
| --- | --- |
| 1-5 | Area A |
| 6-10 | Area B |
| 11 and above | Area C |

As shown, Table 1 includes a plurality of table records. Each table record includes a predetermined range of shade error count C and a corresponding ESD-prone area in the imaging device 100. As an example, if a shade error count C of 2 is determined, then imaging device 100 may notify the user via user interface 102 that a potential ESD issue is occurring in Area A and displaying the location of Area A. As a result, lookup table T provides a reference for determining a possible area within imaging device 100 where a potential ESD issue is occurring based on the shade error count C. Area A may for example and not limitation be adjacent to scanner system 200, similarly area B may be adjacent to fuser 114, area C may be adjacent to cleaner unit 115.

In another example embodiment, healthcheck diagnostics for ESD detection using the shade error count C may be performed during production line assembly of imaging device 100 in a factory. For example, a line operator may perform test scans using scanner system 200 and be notified via user interface 102 of imaging device 100 or the user interface of computer 150 if the shade error count C reaches a predetermined threshold. The line operator may then execute adjustments or notify a service engineer to fix the issue.

In another example embodiment, ESD detection may be performed remotely on imaging devices deployed at customer locations. For example, in a managed print services (MPS) platform where printer manufacturers and/or MPS providers manage fleets of imaging devices for business organizations and are responsible for maintaining and servicing the imaging devices, a technical support agent may remotely query and retrieve healthcheck data including the shade error count C from the imaging device at the customer location to perform healthcheck diagnostics. The technical support agent may utilize the remotely reported shade error count C to determine whether or not the imaging device is having ESD issues. Alternatively, the imaging device may be configured to upload healthcheck data to a remote storage location and the MPS provider may retrieve the healthcheck data from the remote storage location and analyze it to determine if the imaging device is having ESD issues. If ESD issues are discovered using the healthcheck data, the MPS provider may dispatch a service technician to the customer site and direct the service technician on where to look to fix the ESD issue. In this way, even if the user is not unaware of image corruption, the MPS provider may still be able to detect if the imaging device is experiencing shade errors, and thus ESD events, and rectify the issue before more serious failures occur. Remotely performing healthcheck diagnostics by retrieving ESD detection data, including the shade error count C, avoids having to dispatch service technician to go onsite to personally check and/or diagnose the imaging device for ESD events.

In another example embodiment, scanner system 200 may be used to detect other self-induced ESD events occurring within imaging device 100 even when scanner system 200 is not in use or actively scanning. For example, during times at which scanner system 200 is not being used to scan target originals, such as when print engine 110 is printing, scanner system 200 may be configured to remain in an ESD-detection mode. While in the ESD-detection mode, scanner system 200 remains idle but AFE circuitry 260 and scan bar 212, 232 may be clocked so that excess charge does not build up on the photoreceptor array and, at the same time, to obtain a plurality of scan lines from AFE circuitry 260. The plurality of scan lines obtained while scanner system 200 is idle and in the ESD-detection mode may be used to provide real-time monitoring of self-induced ESD events in imaging device 100 as described above.

Figure 4:
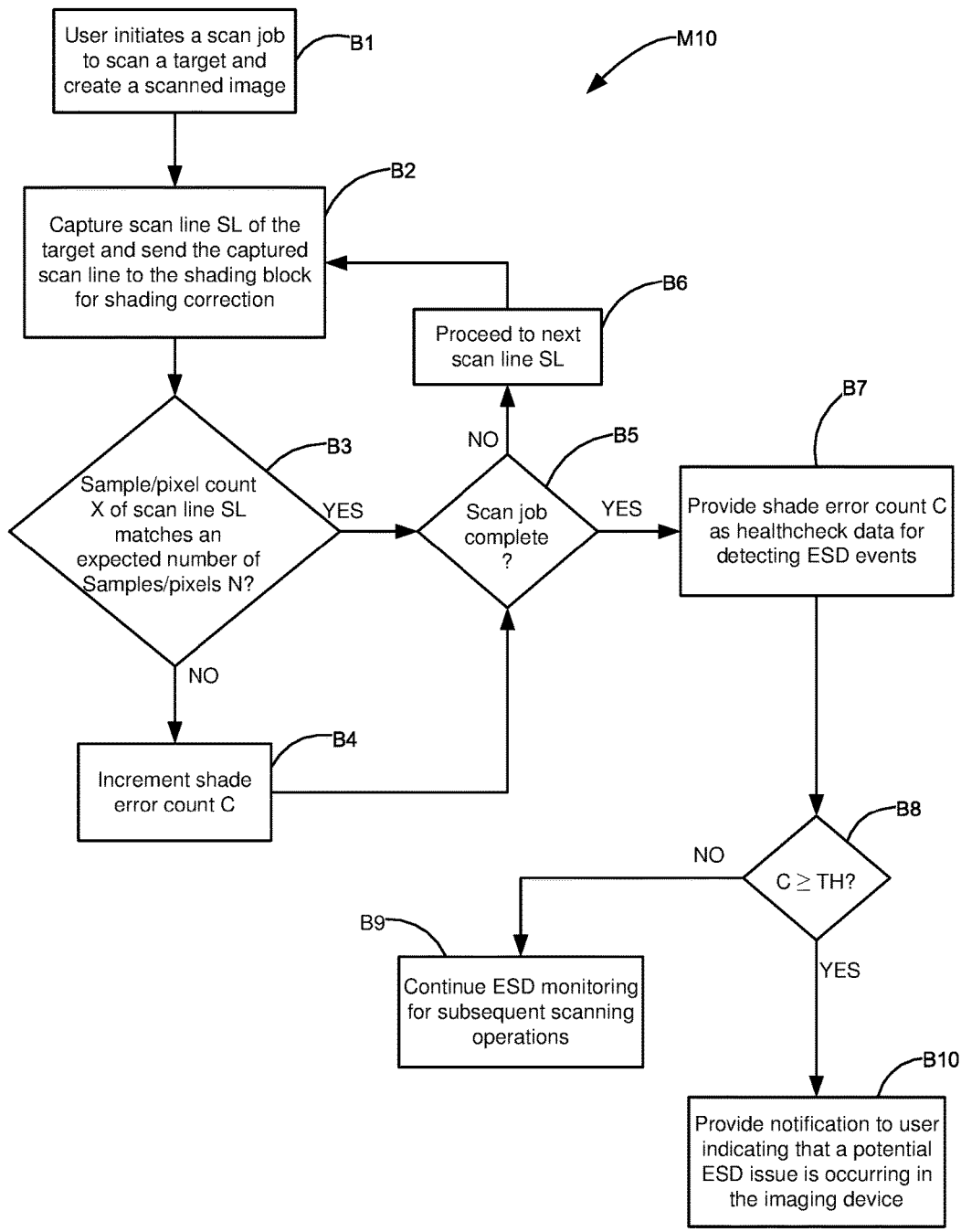
FIG. 4 is a flowchart illustrating a method for detecting ESD event within the imaging device using native electronics of the scanner system according to an example embodiment.

Referring to FIG. 4, a method M10 for detecting ESD events within imaging device using native electronics of scanner system 200 will be described. At block B1, a scan job is initiated by a user to scan a target using scanner system 200 to create a scanned image. At block B2, a scan line SL is captured from the target and sent to shading block 125 for shading correction. At block B3, a determination is made whether or not a sample/pixel count X of the scan line SL matches an expected number of samples/pixels N. When it is determined at block B3 that the sample/pixel count X of the scan line SL does not match the expected number of samples N, the shade error count C is incremented at block B4. After either performance of block B4 or when it is determined at block B3 that the sample count X of the scan line SL matches the expected number of samples N, method M10 proceeds to block B5 where a determination is made whether or not the scan job is complete. When it is determined at block B5 that the scan job is not complete, method M10 proceeds to block B6 to proceed to the next scan line SL and then back to block B2 to capture the next scan line SL from the target and send the next scan line SL to shading block 125 for shading correction. When it is determined at block B5 that the scan job is complete, scan operation is ended and the shade error count C is provided as healthcheck data for determining whether or not ESD events are occurring within imaging device 100 at block B6. At block B8, a determination is made whether or not the shade error count C is greater than or equal to a predetermined threshold TH. When it is determined at block B8 that the shade error count C is less than the predetermined threshold TH, scanner system 200 remains in the ESD-detection mode in which ESD monitoring continues for subsequent scanning operations at block B9. When it is determined at block B8 that the shade error count C is greater than or equal to the predetermined threshold TH, then a notification is provided to a user indicating that a potential ESD issue is occurring within imaging device 100 at block B10.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodi-

What is claimed is:

1. A method for detecting electrostatic discharge, ESD, events in an imaging device, comprising:
   activating a scanner of the imaging device to perform a scan line operation to capture a scan line, the captured scan line having one of a number of pixels and a number of samples;
   determining whether or not a mismatch exists between the one of the number of pixels and the number of samples of the scan line and a respective one of a predetermined number of pixels and a predetermined number of samples; and
   upon determining that a mismatch exists, incrementing a count value;
   wherein the count value indicates at an ESD event has occurred in the imaging device.

2. The method of claim 1, further comprising determining whether or not the count value has reached a predetermined threshold, and on determining that the count value has reached the predetermined threshold, determining that the ESD event has occurred within the imaging device.

3. The method of claim 2, further comprising providing a feedback to a user indicating that the ESD event has occurred within the imaging device.

4. The method of claim 1, further comprising providing the count value as a healthcheck data to a remote computing device.

5. The method of claim 1, wherein the one of the predetermined number of pixels and the predetermined number of samples is based upon a resolution setting of the scanner.

6. The method of claim 1, wherein the scanner includes one of a flatbed scanner and an automatic document feeder, ADF, scanner.

7. The method of claim 1, further comprising applying shading correction to the captured scan line, and determining whether or not an error has occurred during the shading correction of the captured scan line, wherein the incrementing the count value is based at least upon a positive determination that an error has occurred during the shading correction of the captured scan line.

8. The method of claim 7, wherein the determining whether or not an error has occurred during the shading correction is based on the determining whether or not a mismatch exists between the one of the number of pixels and the number of samples of the scan line and the respective one of the predetermined number of pixels and the predetermined number of samples.

9. A method for detecting electrostatic discharge, ESD, events in an imaging device, comprising:
   scanning a target placed in a scanner of the imaging device to create a scanned image of the target, the scanned image having a plurality of scan lines with each scan line having one of a number of pixels and a number of samples; and
   for each scan line in the plurality of scan lines:
      determining whether or not the one of the number of pixels and the number of samples of the scan line matches a respective one of a predetermined number of pixels and a predetermined number of samples; and
      upon determining that one of the number of pixels and the number of samples of the scan line does not match the respective one of the predetermined number of pixels and the predetermined number of samples, incrementing a count value;
   wherein the count value indicates an ESD event has occurred in the imaging device.

10. The method of claim 9, further comprising determining whether or not the count value has reached a predetermined threshold, and on determining that the count value has reached the predetermined threshold, determining that the ESD event has occurred within the imaging device.

11. The method of claim 10, further comprising, upon determining that the ESD event has occurred within the imaging device, providing a feedback to a user indicating that the ESD event has occurred within the imaging device.

12. The method of claim 9, further comprising retrieving, by a remote computing device, the count value from the imaging device as a healthcheck data.

13. The method of claim 9, further comprising uploading the count value to a remote computing device as a healthcheck data.

14. The method of claim 9, wherein the one of the predetermined number of pixels and the predetermined number of samples is based upon a resolution setting of the scanner.

15. The method of claim 9, further comprising applying shading correction to each scan line of the plurality of scan lines and, for each scan line, indicating that an error has occurred during shading correction of the scan line upon a positive determination that one of the number of pixels and the number of samples of the scan line does not match the respective one of the predetermined number of pixels and the predetermined number of samples, wherein the incrementing the count value is based at least upon the indicating that the error has occurred during shading correction of the scan line.

16. The method of claim 9, further comprising, for each of the plurality of scan lines, initiating an interrupt upon a positive determination that the one of the number of pixels and the number of samples of the scan line does not match the respective one of the predetermined number of pixels and the predetermined number of samples, wherein each interrupt increments the count value.

17. A method for detecting electrostatic discharge, ESD, events in an imaging device, comprising:
   scanning a target placed in a scanner of the imaging device to create a scanned image of the target, the scanned image having a plurality of scan lines;
   applying shading correction to each of the plurality of scan lines; and
   for each scan line in the plurality of scan lines:
      determining whether or not an error has occurred during the shading correction of the scan line; and
      upon determining that an error has occurred during the shading correction of the scan line, incrementing a count value;
   wherein the count value indicates an ESD event has occurred in the imaging device.

18. The method of claim 17, wherein the determining whether or not an error has occurred during the shading correction of the scan line includes determining that the error has occurred when one of a number of pixels and a number of samples of the scan line does not match a respective one of a predetermined number of pixels and a predetermined number of samples.

19. The method of claim 17, further comprising determining whether or not the count value has reached a predetermined threshold, and on determining that the count value has reached the predetermined threshold, determining that the ESD event has occurred within the imaging device.

20. The method of claim 18, wherein the one of the predetermined number of pixels and the predetermined number of samples is based upon a resolution setting of the scanner.

\* \* \* \* \*